Figure 1:
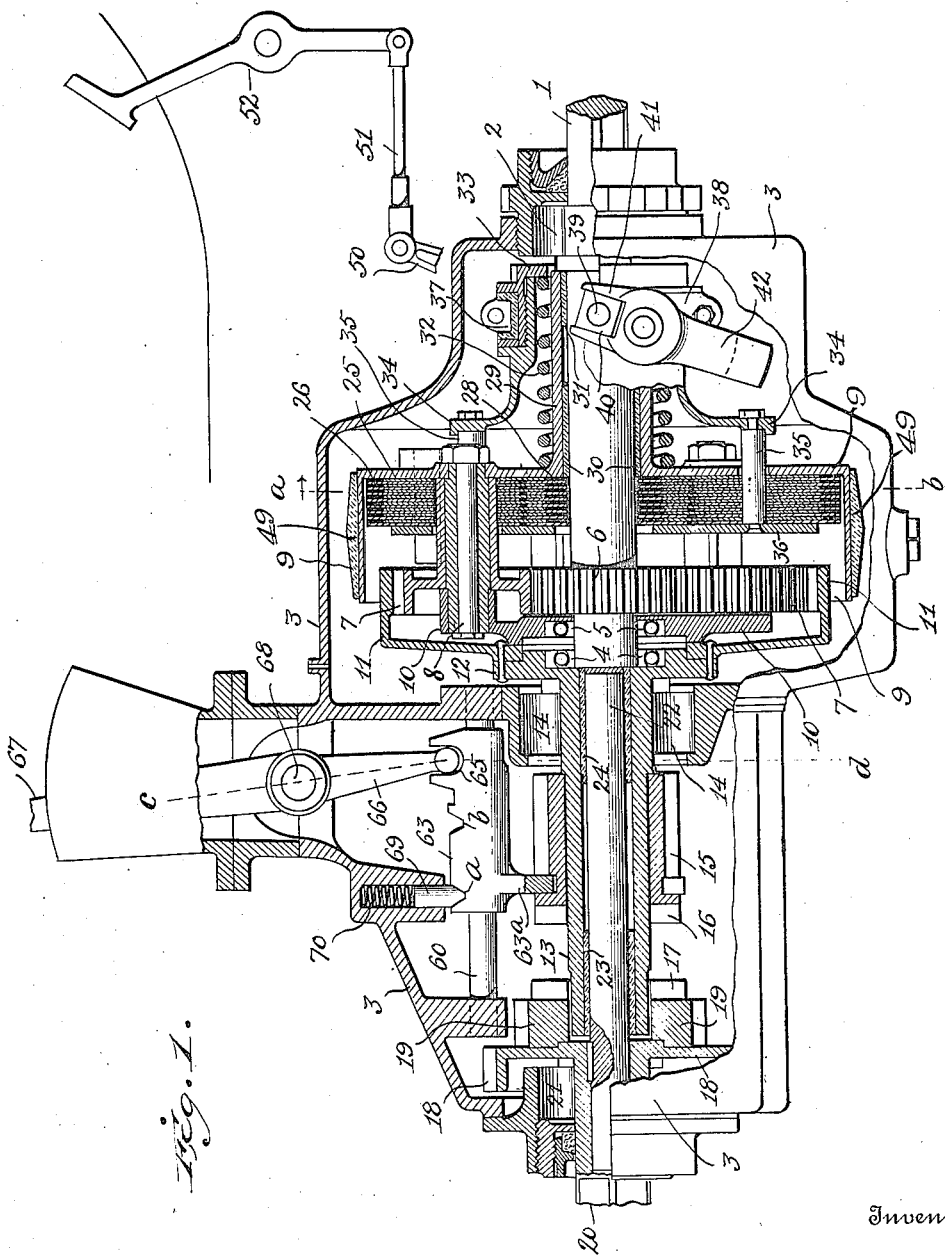

G. D. MUNSING.
SPEED CHANGING MECHANISM.
APPLICATION FILED MAY 17, 1911.

1,163,842.

Patented Dec. 14, 1915.
2 SHEETS—SHEET 1.

Witnesses
B. W. Sommers
Elizabeth Leckert.

Inventor
George D. Munsing
By Henry Orth Jr.
Attorney

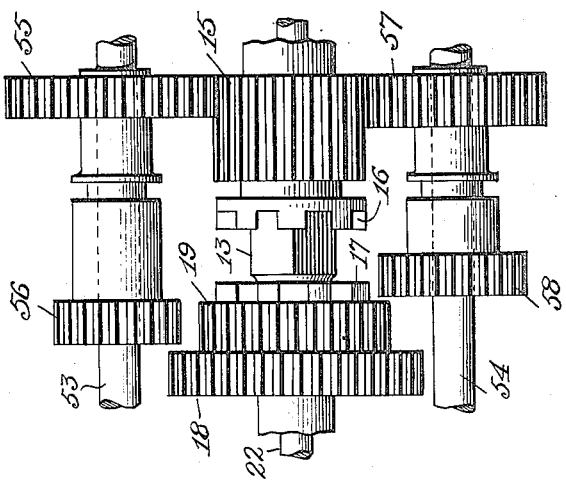
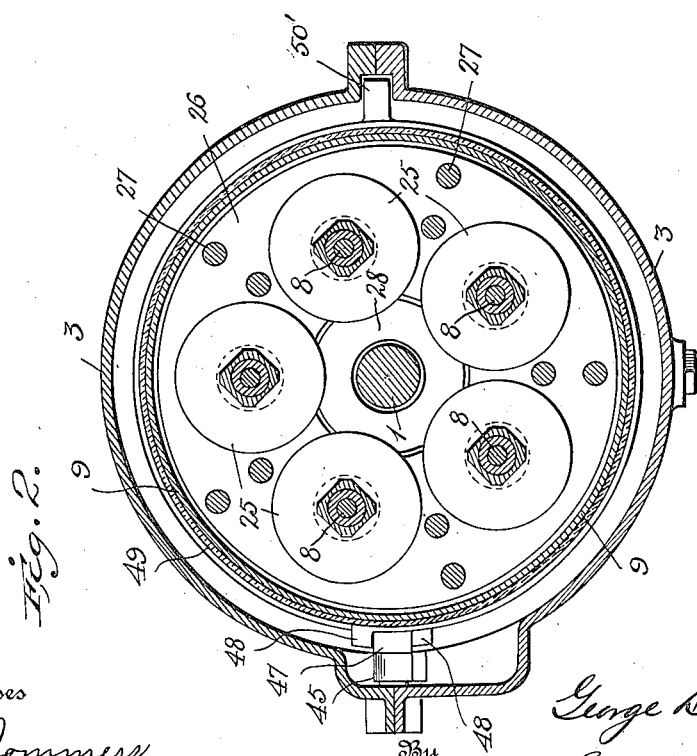

UNITED STATES PATENT OFFICE.

GEORGE D. MUNSING, OF NEW YORK, N. Y., ASSIGNOR TO GEORGE D. MUNSING AND CHARLES E. INGERSOLL, BOTH OF NEW YORK, N. Y., COPARTNERS DOING BUSINESS AS MUNSING AND INGERSOLL.

SPEED-CHANGING MECHANISM.

1,163,842. Specification of Letters Patent. Patented Dec. 14, 1915.

Application filed May 17, 1911. Serial No. 627,864.

*To all whom it may concern:*

Be it known that I, GEORGE D. MUNSING, a citizen of the United States of America, residing at New York city, in the county and State of New York, have invented certain new and useful Improvements in Speed-Changing Mechanism; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to change speed mechanism, and has for its object to provide a simple, efficient and reliable operating mechanism of this type adapted to change the speed of any driven member by means of sliding gears, and is more particularly adapted for motor vehicles.

Referring to the drawings, in which like parts are similarly designated—Figure 1 is a vertical, longitudinal, central section through the mechanism. Fig. 2 is a section on line *a—b* of Fig. 1. Fig. 3 is a plan view of the sliding gears.

The driving shaft 1 is connected to or operated from the shaft of a prime mover, which in a motor vehicle is the engine shaft. This shaft 1 is journaled in a roller bearing 2 in a casing 3, and its opposite end has bearing in two ball bearings 4—5, hereinafter described.

Mounted on the driving shaft is a gear wheel 6 that meshes with a number of planet gears 7, which planet gears are mounted on shafts 8 supported at one end in a brake wheel 9 and at the other end in a spider 10, free to rotate on the driving shaft, and between which and the driving shaft is located the ball bearing 5. The planet gear wheels 7 mesh with an internal gear wheel 11 which is bolted or otherwise secured to a flange 12 of a sleeve 13, said sleeve 13 being mounted in a roller bearing 14 in the casing 3, and carrying the roller bearing 4. On this sleeve 13 is slidably, but not rotatably, mounted a long pinion 15, having a clutch face 16, said clutch face 16 capable of engaging a clutch face 17 on a double-gear 18—19 secured to the driven shaft 20. This driven shaft 20 is mounted in a roller bearing 21 in the casing 3, and has an internal bore. The gear wheel 18 has a central recess in which is keyed a shaft 22 extending within the sleeve 13 and supported therein by bushings 23 and 24.

Non-rotatably mounted on the squared bosses or sleeve extensions of the planet gears 7 are a number of friction plates 25 (Fig. 2). These friction plates alternate with a number of annular friction plates 26 which are mounted on pins 27 secured in the brake wheel 9, and in the same plane as friction plates 26 are friction plates 28 mounted on the driving shaft within the centers of the plates 26 and alternating with and overlapping the plates 25. All of the plates are axially slidable, and the center ones 28 may be non-rotatable on the driving shaft 1, or they may be rotatable on said shaft 1, as desired.

The brake wheel 9 has an extended hub 29 mounted on bushings 30 and 31 on the driving shaft 1. Surrounding this hub is a coil spring 32 one end of which has bearing against the brake wheel 9, and the other end has bearing against a flange 33 on a slidable spider 34. Secured to this spider are pins 35 that pass through holes in the brake wheel flange and plates 26, and between the planet friction plates 25 to a follower 36, so that the action of the spring 32 on flange 33 will cause the spider 34 to be held toward the right and the follower 36 up against the friction plates, so that they will be locked together. On the spider 34 is a groove 37 in which is slidably mounted a ring 38, said ring being provided with trunnions 39 having bearing in blocks 40 slidably mounted in bearings 41 on a bent shaft 42. This bent shaft 42 is suitably mounted in the casing 3 and acts on a lever 45 pivoted in the casing 3. The lever 45 has two cams 47 that operate on the ends 48 of a brake band 49 secured within the casing 3, by means of a lug 50' engaging a recess in the casing diametrically opposite the ends 48 of the brake band. The brake band 49 surrounds the brake wheel 9, clearly shown in Fig. 2. Secured to the bent shaft 42, is a lever 50 connected at its upper end by a link 51 to a foot lever 52.

Parallel with the sleeve 13 are two preferably round shafts 53 and 54, Fig. 3, rotatable in bearings in the casing 3. Mounted free to rotate and also free to slide on shaft 53 are a pair of connected gears 55 and 56. The one 55 capable of meshing with the pinion 15, and the one 56 capable of meshing with the gear 18 of the double gear 18—19.

Mounted on shaft 54 so as to be both rotatable and slidable thereon is a pair of connected gear wheels 57 and 58. The one 57 capable of meshing with the pinion 15 and the other 58 capable of meshing with the gear 19 of the double gear wheel 18—19. Above each shaft 53—54 and sleeve 13 is a shaft 60. On each of these shafts is mounted a slidable sleeve 63 having a fork 63ª engaging a pair of gears and the pinion 15. In order to slide these wheels axially each sleeve is provided with an operating notch 65 into which is capable of being moved the lower end 66 of an operating lever 67 pivoted at 68. This operating lever is loose on its pivot 68 and is slidable laterally thereon so as to be moved into engagement with the sleeves 63. Each sleeve 63 has two notches $a$, $b$, adapted to be engaged by pins 69, urged by springs 70. There is one of these pins and springs for each sleeve so that when the sleeves are moved to position, shown in Fig. 1 and the pins engage the notches $a$ all the gears are in disengaged or inoperative position. By moving the lever 67 to move any one of the sleeves 63 so that the pins 69 will enter notches $b$, any one of the gears may be thrown into operation.

It will be noted that the plates 28 slightly overlap the plates 25 and have a small amount of frictional engagement therewith. As the lower edges of the plates 28 always project into the oil contained in the casing 3, a small amount of the oil will, when the plates 28 rotate, be carried onto the upper plates 25 and transferred by the latter onto the plates 26. This overlapping of the plates also assists in the separation of the several plates when the follower 36 is released.

The operation of the device is as follows: When the parts are in the position shown in Fig. 1, the friction plates clutch the planet pinions 7 so that the brake wheel, planet pinions, gear wheel 6 and internal gear 11, sleeve 13 and pinion 15 rotate as a unit, and incidentally the gear wheels 55 and 57 are driven from the pinion 15 so that the gear wheels 55, 56, 57 and 58 rotate idly. By moving the lever 67 forward to the extreme limit the pin 69, Fig. 1 will enter notch $b$ and the pinion 15, which rotates in unison with the driving shaft, is shifted causing the clutch face 16 to engage clutch face 17. The shifting of the pinion 15 moves it out of mesh with the gear wheels 55 and 57 and the engagement of the clutch faces causes the double gear 18—19 to rotate at engine speed while the gear wheels 55, 56, 57 and 58 remain stationary. Returning pinion 15 to the position shown in Fig. 1 and laterally shifting lever 67 either to the right or left, either of the pairs of pinions 55—56 or 57—58 may be moved into action. When gear wheels 55 and 56 are moved by lever 67 the gear wheel 56 meshes with gear 18 and we have low speed. If on the other hand gear wheels 57 and 58 be moved into action the gear wheel 58 meshes with the gear wheel 19 and we have medium speed. It will be observed that by reason of the recesses 65 being in alinement it will be necessary to return lever 67 always to the position shown in Fig. 1 before laterally moving said lever to shift to another speed. For the proper operation of the change speed mechanism it is necessary or desirable when shifting pinion 15 to position shown in Fig. 1 that it come into mesh, first with one and then with the other of the two gears 55—57, in other words one of the gears 55—57 should lead in meshing with the pinion 15. This may be done either by setting one of the gears 55—57 in advance of the other or as I have shown in Fig. 3 by making gear wheel 57 with a little wider face than the gear wheel 55 so that when the pinion 15 is brought back to the position Fig. 1 after being on high speed it will catch one of the gear wheels, say, 57, before it engages with the other gear wheel 55. In order to reverse it is simply necessary to press the foot lever 52 which operates lever 50 to cause the spider 34 with the follower 36 connected thereto to move to the left against the action of its spring 32 to release the friction plates. Simultaneously the shaft 42 rotates the cams 47 and causes the friction band 49 to hold the brake wheel 9 thereby reversing the direction of rotation at a slower speed, so that the reverse can be effected independent of the speed being transmitted through the pinion 15 and gear wheels 55, 56, 57, 58, 18 and 19, in other words, reversal can take place at either high speed, medium speed or low speed or at any forward speed without shifting any of the gears. Another decided advantage is that when running forward at any of the forward speeds by suitably manipulating the foot lever 52 this speed can be varied through zero to the reverse at will according to the pressure placed on the foot lever 52.

What I claim is:

In combination, a driving shaft, a pinion mounted thereon, a brake wheel and its brake member, planet wheels mounted on the brake wheel and meshing with said pinion, friction plates mounted in the brake wheel, coöperating friction plates slidably and nonrotatively mounted on the planet wheels, a compressor for the friction plates, a spider, means passing through the first mentioned friction plates and between the second mentioned friction plates to connect the spider and compressor, a spring to urge the spider and cause the compressor to compress the plates, and means to move the spider against its spring action.

In testimony that I claim the foregoing as my invention, I have signed my name in presence of two subscribing witnesses.

GEORGE D. MUNSING.

Witnesses:
GEORGE W. PERCY,
JAMES H. WESTCOTT.